No. 677,136. Patented June 25, 1901.
A. KRASTIN.
BALL BEARING.
(Application filed July 18, 1900.)
(No Model.)
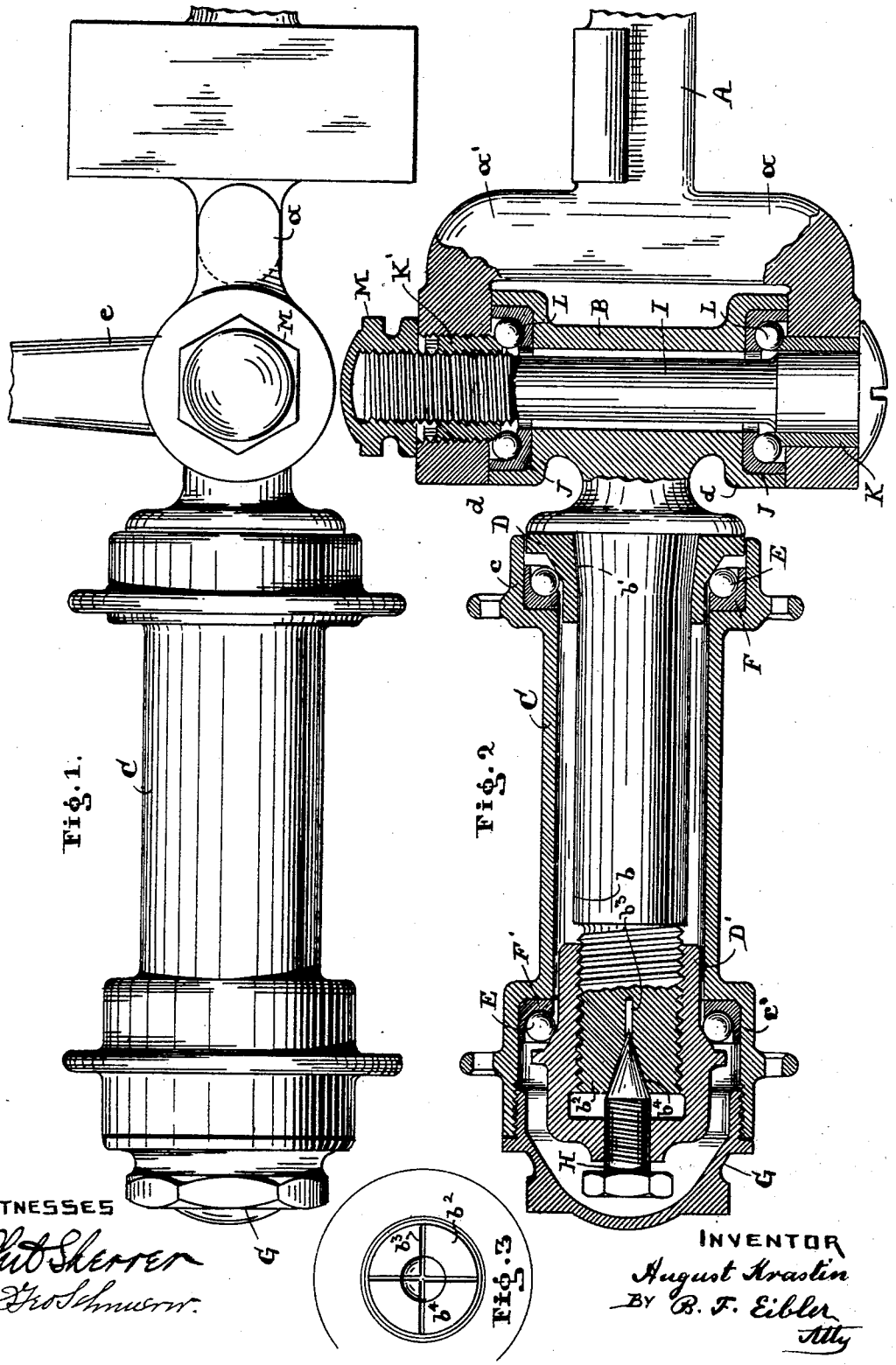
WITNESSES
INVENTOR
August Krastin
By B. F. Eibler
Atty

UNITED STATES PATENT OFFICE.

AUGUST KRASTIN, OF CLEVELAND, OHIO.

BALL-BEARING.

SPECIFICATION forming part of Letters Patent No. 677,136, dated June 25, 1901.

Application filed July 18, 1900. Serial No. 24,000. (No model.)

*To all whom it may concern:*

Be it known that I, AUGUST KRASTIN, a citizen of the United States of America, and a resident of Cleveland, in the county of Cuyahoga and State of Ohio, have invented certain new and useful Improvements in Ball-Bearings, of which the following is a specification.

My invention relates to improvements in ball-bearings adapted more particularly for steering-knuckles and hubs of motor-vehicles; and the object of my invention is to provide accurately-adjustable, durable, and reliable ball-bearings for said parts of motor-vehicles.

I attain this object in and by the constructions as shown in the accompanying drawings, in which—

Figure 1 represents an exterior view of one of the wheel-hubs, a part of the axle, and one steering-knuckle of said gear; and Fig. 2 is a sectional view of the same. Fig. 3 is a face view of one of the knuckle-axles.

Like letters of reference denote like parts in the drawings and specification.

As shown, the axle A proper terminates in bifurcations $a$ $a'$, which are adapted for reception of the steering-knuckles B B, which carry the wheel-hubs C C upon the cones D D', the latter being securely connected with the axle part $b$ of said knuckles, substantially as shown in Fig. 2. The inner cone D is driven upon the cone part $b'$, while the outer cone D' has screw-threaded connection with the shank $b^2$. The balls E E roll in hardened-steel rings F F', which are fitted into the cups $c$ $c'$ of the hubs C C. Into the outer cup $c'$ is screwed a cap G, which, aside from its ornamental effect, renders said cup dust-proof. Furthermore, the shank $b^2$ is slotted, as at $b^3$, and countersunk, as at $b^4$, for reception of the pointed screw H of the cone D'. After said cone D' is adjusted, so that the balls may freely roll upon and between said cones under absence of lost motion, then the screw H is applied to effect an expansion of shank $b^2$ for the purpose of retaining the cone D' in locked condition upon and with the axle part $b$.

As shown, the shank and cone are threaded right and left hand. Thus when once set they cannot become loose of their own accord or accidentally, since forces applied in opposite direction only are capable of loosening said cone from a given position.

The connection of the knuckle and the fixed part of the axle proper is established chiefly by the spindle I and ball-bearings arranged between the bifurcations $a$ $a'$. (See Fig. 2.) Said bearings consist of the rings J J, the bushings K K', and the balls L L. The rings fit within the cups $d$ $d$. One of the bushings (the bushing K) extends through the lower branch $a$ and is retained therein by means of the head of spindle I. The other bushing K' is threaded internally as well as externally. By its external threading same is connected with the branch $a'$, while the internal thread receives the threaded part of the spindle. Thus simply by adjusting the bushing K' perfect raceways can be established for the lower balls as well as the upper balls. Upon the outer terminal of the spindle is employed a nut M, which serves the double purpose—namely, that of locking the bushing upon the spindle as well as upon the branch or arm $a'$ of the axle. When adjusted, the knuckle will therefore remain in an accurately-guided and frictionless condition, which state of affairs is essential for a properly-constructed steering-gear.

What I claim, and desire to secure by Letters Patent, is—

1. The combination with the steering-knuckle of motor-vehicles of the wheel-hub C, rings F F', cones D D', series of balls E E and a pointed screw, threaded in the outer adjustable cone and entering the split axle part of the knuckle for expansion of same all constructed and arranged substantially as shown and described.

2. The combination with an axle-fork of a spindle, bushings, rings, balls and a lock-nut, one of said bushings being screw-threaded internally and externally for adjustment of itself with regard to the balls and the spindle all constructed and arranged substantially as and for the purpose set forth.

Signed at Cleveland, Ohio, this 12th day of July, 1900.

AUGUST KRASTIN.

Witnesses:
BERNHARD F. EIBLER,
J. GEO. SCHIMERER.